United States Patent
Wettlaufer et al.

(10) Patent No.: US 10,811,929 B2
(45) Date of Patent: Oct. 20, 2020

(54) MOTOR SYSTEM

(71) Applicant: Lenze Drives GmbH, Extertal (DE)

(72) Inventors: Jan Wettlaufer, Hameln (DE);
Abdenbi Maghnaoui, Bielefeld (DE);
Torben Jonsky, Hannover (DE);
Volker Grabs, Bodenwerder (DE);
Martin Ehlich, Kalletal (DE)

(73) Assignee: Lenze Drives GmbH, Extertal (DE)

( * ) Notice: Subject to any disclaimer, the term of this patent is extended or adjusted under 35 U.S.C. 154(b) by 480 days.

(21) Appl. No.: 15/529,403

(22) PCT Filed: Nov. 23, 2015

(86) PCT No.: PCT/EP2015/077389
§ 371 (c)(1),
(2) Date: May 24, 2017

(87) PCT Pub. No.: WO2016/083320
PCT Pub. Date: Jun. 2, 2016

(65) Prior Publication Data
US 2017/0331345 A1    Nov. 16, 2017

(30) Foreign Application Priority Data
Nov. 24, 2014   (DE) .................. 10 2014 223 909

(51) Int. Cl.
*H02K 5/20*    (2006.01)
*H02K 9/16*    (2006.01)
(Continued)

(52) U.S. Cl.
CPC .................. *H02K 5/20* (2013.01); *H02K 5/16* (2013.01); *H02K 9/16* (2013.01); *H02K 11/33* (2016.01)

(58) Field of Classification Search
CPC ............. H02K 5/20; H02K 9/16; H02K 11/33
See application file for complete search history.

(56) References Cited

U.S. PATENT DOCUMENTS

| 5,341,074 A | 8/1994 | Zorzolo |
| 5,548,169 A * | 8/1996 | Iwasa ..................... H02K 17/30 |
| | | 310/68 R |

(Continued)

FOREIGN PATENT DOCUMENTS

| CN | 1302470 A | 7/2001 |
| CN | 1399393 A | 2/2003 |

(Continued)

OTHER PUBLICATIONS

Chinese-language Office Action issued in counterpart Chinese Application No. 201580063905.6 dated Sep. 18, 2018 (seven (7) pages).

(Continued)

*Primary Examiner* — Ramon M Barrera
(74) *Attorney, Agent, or Firm* — Crowell & Moring LLP

(57) ABSTRACT

A motor system includes: a stator; a rotor; a motor shaft, which is mechanically coupled for conjoint rotation with the rotor, and which defines a radial direction and an axial direction of the motor system; heat-generating components, in particular power semiconductors; a control device which is designed to control an operation of the motor system; and a housing. The housing has a first central chamber, wherein the stator, the rotor and the heat-generating components are arranged inside the first chamber, and wherein the heat-generating components are connected to an outer wall of the first chamber, and has a number of second chambers, wherein the second chambers radially surround the first chamber, and wherein the second chambers form closed channels for guiding cooling air.

15 Claims, 2 Drawing Sheets

(51) Int. Cl.
*H02K 11/33* (2016.01)
*H02K 5/16* (2006.01)

(56) References Cited

U.S. PATENT DOCUMENTS

| | | |
|---|---|---|
| 8,933,600 B2 | 1/2015 | Liu et al. |
| 2007/0284157 A1* | 12/2007 | Heller .................. H02K 7/006 180/54.1 |
| 2013/0320786 A1 | 12/2013 | Isoda et al. |

FOREIGN PATENT DOCUMENTS

| | | |
|---|---|---|
| CN | 101908792 A | 12/2010 |
| CN | 201860218 U | 6/2011 |
| DE | 44 22 622 A1 | 1/1996 |
| DE | 44 43 427 C2 | 4/2002 |
| DE | 102 39 557 A1 | 3/2004 |
| DE | 10 2004 048 908 A1 | 4/2006 |
| DE | 10 2012 218 444 A1 | 4/2014 |
| EP | 0 505 663 A1 | 9/1992 |
| FR | 2 145 704 | 2/1973 |
| FR | 2 986 673 A1 | 8/2013 |
| GB | 1391957 | 4/1975 |
| WO | WO 95/06971 A1 | 3/1995 |
| WO | WO 00/74204 A2 | 12/2000 |
| WO | WO 2013/114043 A2 | 8/2013 |

OTHER PUBLICATIONS

International Search Report (PCT/ISA/210) issued in PCT Application No. PCT/EP2015/077389 dated Feb. 17, 2016 with English translation (seven pages).
German-language Written Opinion (PCT/ISA/237) issued in PCT Application No. PCT/EP2015/077389 dated Feb. 17, 2016 with English translation (11 pages).

* cited by examiner

MOTOR SYSTEM

BACKGROUND AND SUMMARY OF THE INVENTION

The invention relates to a motor system.

The object of the invention is to provide a motor system with optimized thermal properties by comparison with the prior art.

The invention achieves this object by a motor system-comprising a stator, a rotor, a motor shaft, which is mechanically coupled for conjoint rotation with the rotor, and which defines a radial direction and an axial direction of the motor system, heat-generating components, a control device, which is configured to control an operation of the motor system, and a housing. The housing comprises a first central chamber, wherein the stator, the rotor and the heat-generating components are arranged inside the first chamber, and wherein the heat-generating components are connected to an outer wall of the first chamber, and a number of second chambers, wherein the second chambers radially surround the first chamber, and wherein the second chambers form closed channels for guiding cooling air.

Firstly, the motor system has a stator, a rotor and a motor shaft. The motor shaft is mechanically coupled to the rotor for conjoint rotation. The motor shaft defines a radial direction and an axial direction of the motor system. The axial direction is the direction in which the axis of rotation of the motor shaft extends, and the radial direction is the direction radially with respect to the axis of rotation of the motor shaft.

The stator can serve conventionally for generating a magnetic rotating field. The stator can have stator poles which are provided with individual windings.

The rotor can serve for generating a magnetic field which is fixed relative to the rotor and interacts with the magnetic rotating field generated by means of the stator in such a way as to produce a desired motor torque which is transmitted or output towards the exterior.

The motor system also has heat-generating components, for example power semiconductors, IGBT modules, power modules, control electronics, current sensors, etc. The heat-generating component can serve for generating the magnetic stator rotating field.

The motor system also has a control device which is designed to control operation of the motor system. The control device is operatively connected to the heat-generating components and can, for example, form a frequency converter together with said components.

The motor system also has a housing.

The housing has a first central or inner chamber, which is in particular cylindrical, wherein the stator, the rotor and the heat-generating components (and possibly the control device) are arranged inside the first chamber.

The first chamber can be segmented axially into a number of part-chambers which, for example, can be thermally insulated from one another by means of thermal barrier layers. For this case, for example, the stator and the rotor can be arranged in a first part-chamber and the heat-generating component can be arranged in a second part-chamber, wherein the first and the second part-chambers are axially offset relative to one another and are thermally insulated from one another.

The heat-generating components are connected, in particular in a heat-conducting manner, or mechanically coupled to an external wall or outer rim or delimiting side surfaces of the first chamber. The first chamber can be sealed towards the exterior or with respect to the surroundings according to a predetermined sealing class.

The housing also has a number (for example two to ten, preferably four) of second chambers or channels which are in particular cylindrical and extend axially, wherein the second chambers or the channels partially or completely surround the first chamber radially externally. In other words, the second chambers or the channels surround the first chambers on the outside. The second chambers or the channels are connected, in particular in a heat-conducting manner, to the external wall of the first chamber, for example as the first chamber and the second chambers have partially common wall portions. The second chambers form closed axially extending channels for conveying a cooling medium, in particular in the form of cooling air. Cooling air can be blown into the channels, for example from the outside.

The housing can have an inner cylinder or cylindrical portion which forms the first chamber, wherein an inner surface of the cylinder or of the cylindrical portion forms the external wall. The inner cylinder can extend axially.

The housing can have a number of outer cylinders which form the number of second chambers. The outer cylinders can extend axially.

The housing can have a cylindrical metal extrusion profile or can be a cylindrical metal extrusion profile which extends axially.

The motor system can have a first and a second bearing plate, wherein a base surface of the inner cylinder is formed by the first bearing plate and a cover surface of the inner cylinder is formed by the second bearing plate. In other words, the first central or inner chamber is formed by a cylinder, wherein the shell surface of the cylinder forms an outer wall in the axial direction and the bearing plates form the outer end walls or radially extending outer walls.

Motor bearings of the bearing plates can be arranged in such a way that the axis of rotation of the motor shaft is collinear or parallel with the axial extent of the inner or the outer cylinders.

A radially extending or radial cross-sectional surface (i.e. a cross-sectional surface in a cross-sectional plane which is perpendicular to the axis of rotation of the motor shaft) of the housing can contain a central main through opening and a plurality of secondary through openings radially surrounding the main through opening for conveying the cooling air. A radial cross-sectional area of the main through opening can be greater than respective radial cross-sectional areas of the secondary through openings. Of the centroids of the areas of the through openings of the cylindrical housing portion, the centroid of the area of the main through opening can be closest to the centroid of the area of the overall cross section.

The stator and/or the heat-generating components can be located inside the radial extent of the main through opening of the cylindrical housing portion.

The heat-generating components can be connected in a heat-conducting manner to the outer wall of the first chamber within a predetermined axial portion with a defined axial extent, for example 1 to 10 cm.

The heat-generating components can be distributed over the circumference of the main through opening within an axial portion of the cylindrical housing.

The stator and the power modules can be arranged in an axial succession inside the main through opening of the same axial housing portion.

The heat-generating components can be connected in a heat-conducting manner to the cylindrical housing portion or the outer wall of the first chamber in such a way that they discharge the majority (i.e. >50%) of their thermal output via the cylindrical housing portion or the outer wall of the first chamber.

Different components of the housing can be decoupled from one another by thermal barrier layers which are arranged between the contact surfaces of the components.

The stator poles of the stator can be connected in a heat-conducting manner to the cylindrical housing portion or the outer wall of the first chamber in such a way that they discharge the majority (i.e. >50%) of their thermal output via the cylindrical housing portion or the outer wall of the first chamber.

For reduction of the heat-conducting contact resistance, plastic fillers which improve the heat conduction can be arranged between the heat-generating components and the cylindrical housing portion or the outer wall of the first chamber.

In the event of thermal decoupling, the windings of the stator poles can be supplied with current in such a way that an operating temperature averaged over time (for example 140° C.) of the stator is significantly (up to 100 K) above the permissible barrier layer temperature of the power semiconductor, i.e. no significant heat transfer takes place from the winding to the heat-generating components.

In particular in the case of new semiconductor materials (for example, silicon carbide, etc.) it is possible to cool the heat-generating components via the windings of the stator poles. In this case thermal decoupling must be avoided.

The heat-generating components can be mechanically coupled, directly or by means of at least one intermediate piece made of good heat-conducting material, to the cylindrical housing portion or the outer wall of the first chamber.

For reduction of the heat-conducting contact resistance, means for generating normal forces between the corresponding contact surfaces can be provided on the components participating in the heat conduction. The means for generating the normal forces can be based on elastic structures. For example, spring rings or hollow rings filled with compressed air can be used. The elastic material properties of the components themselves, for example of the housing, can be used (screw connection). The normal forces can also be generated by the internal residual tension after axial pressing into the cylindrical housing.

The housing can have an inner cylinder which forms the first chamber, wherein an outer surface of the cylinder forms the outer wall. The housing can have a number of outer cylinders which form the number of second chambers.

The housing can have or can be a cylindrical extrusion profile in which the cylindrical chambers are formed.

The cylindrical housing portion can be produced by means of a reshaping or primary shaping process or an extrusion process, for example continuous casting, continuous extrusion, etc.

The housing or parts thereof can be made of good heat-conducting material, for example an aluminum alloy.

The second chambers or the axially extending closed channels formed by the second chambers can have surface-enlarging structures such as, for example, ribs.

The cooling air can be moved in the channels and on the surface by means of natural convection and/or by means of forced convection.

The cylindrical housing can be augmented on at least one axial end by end pieces. The end pieces can also be provided as means for receiving motor bearings and, for example, can in each case form a bearing plate. The end pieces can have means for conveying at least one cooling air stream in the direction of the further axial through openings or the channels formed by the second chambers. One of the end pieces or bearing plates can have means for fastening a fan.

The end pieces or bearing plates can delimit the main through opening with respect to the surrounding air and the cooling air stream, so that no dirt can penetrate into the main through opening, i.e. the interior of the motor.

The fan can be operated on the basis of a thermostat function.

A single coil control and/or single phase control can be used for supplying current to the stator windings (single coil: for example 12 windings with 12 associated controls; single phase: for example 12 windings with 6 associated controls, for example by means of full bridges).

A radial cross-sectional area of the first chamber can constitute a regular polygon, or the cross-sectional area of the main through opening of the central cylindrical housing portion can constitute a regular polygon. Based on the regular polygon, planar surfaces, on which the heat-generating components can be contacted simply in a heat-conducting manner, form on the outer wall of the first inner chamber or on the surface of the inner cylinder.

The motor system can have an intermediate circuit capacitor wound as a ring, which can have terminals for connection to a so-called busbar, wherein the busbar can serve for forming an intermediate circuit link. The busbar can have a conductor rail or a connection of a plurality of conductor rails with terminals to the individual heat-generating components and at least one further electrical component, in particular to power semiconductors.

The intermediate circuit capacitor can be arranged inside the first axially cylindrical chamber.

A stator pole can form, with the heat-generating component located closest to it, a mechanically connected modular unit (individual segment). The phases can be electrically connected to the winding of the stator pole.

Groups of stator poles and the heat-generating components which control them can form a mechanical unit.

The heat-generating components and the fan can be arranged on the B side of the stator, wherein the fan forces the cooling air through the channels. Alternatively, the heat-generating components can be arranged on the A side and the fan can be arranged on the B side of the stator, wherein the fan draws the cooling air through the channels.

The heat-generating components can be switching means, for example IGBTs, wherein the switching means have means for determining the connected current. So-called gate drivers can be associated with the switching means.

Stator windings can be controlled in such a way that the windings which do not participate in the generation of the motor torque are used for converting the excess electrical energy during braking into heat. The control for generating heat can be configured in such a way that the amounts of the flow-controlling currents (Id) are increased.

The motor system can have magnetically and/or mechanically acting means for stepping up/reducing the rotational speed of the magnetic rotating field by comparison with the rotational speed of a motor system output.

The motor system can have an (electro-)mechanical brake, the brake drum or brake disc of which is connected to the rotor for conjoint rotation. Connected windings of the electromechanical brake can be supplied with energy from the intermediate circuit.

The magnetic rotor field can be generated permanently magnetically or electromagnetically.

For torque generation the reluctance effect can be used.

The stator windings can be controlled in such a way that in each phase a current with variable frequency is introduced, which contains at least one harmonic wave in addition to the fundamental wave, wherein the amplitudes of the fundamental wave and the harmonic waves can be predetermined and regulated with a positive or negative sign.

The stator windings can be controlled in such a way that in every phase a current with variable frequency is introduced, which contains a subharmonic in addition to the fundamental wave, wherein the amplitudes of the fundamental wave and the harmonic waves can be predetermined and regulated with a positive or negative sign.

The motor system according to the invention can have an encasing, closed and cylindrical housing, in which the power electronics, the stator, the rotor and optionally the electronic controller and the film capacitor are arranged. The power electronics unit is arranged, for example, on outer surfaces of an inner cylinder of a hollow extruded profile or of another air-cooled motor housing. A film capacitor can be provided which is wound as a ring with a plurality of terminals and with low-resistance and low-inductance (short) connection to the power semiconductors which is advantageous in EMC terms.

A thermal barrier layer can be provided between the active motor part and the power electronics unit, for example in the form of a plastic ring as an "intermediate piece" in the housing.

An intake of air into the outer channels of the extruded profile can take place via openings in the bearing plates.

The motor system according to the invention with integrated frequency converter has an encasing cylindrical housing in which a plurality of heat-generating electrical power components and the electromechanical transducer (rotor and stator) are arranged. The control electronics and a heat-resistant intermediate circuit capacitor (film capacitor) are also provided. The bearing plates close off the housing, wherein the intermediate circuit capacitor can also be arranged outside the bearing plates.

Thus, for example, the power electronics unit inside a hollow extruded profile or inside another air-cooled motor housing (for example a standard housing) can be arranged at different locations. The number of power modules can be increased, in particular, in the case of multi-phase systems or single-winding control.

The intermediate circuit capacitor can consist of a film capacitor wound as a ring with a plurality of terminals, which is located between the motor shaft and the housing and has a higher temperature resistance by comparison with the conventional electrolytic capacitor. Simulations have shown that the motor system has a winding head temperature of approximately 60° C. at an ambient temperature of 20° C. (efficiency approximately 95%). The connection of the switching semiconductor takes place directly on the intermediate circuit capacitor. As a result, a low-inductance connection which is advantageous from the point of view of electromagnetic compatibility is guaranteed.

Alternatively or in addition, one or more electrolytic capacitors can be incorporated into the rear bearing plate.

The winding head temperature is at approximately the level of the barrier layer temperature of the power semiconductor. In this case the heat input of the power semiconductor corresponds approximately to the copper losses in the motor windings.

A thermal barrier layer can be arranged between the active part of the motor and the power electronics unit, wherein this barrier layer divides the first chamber into separate part-chambers which are axially offset with respect to one another. This is advantageous if the winding head temperatures cannot be lowered to the level of the barrier layer temperature of the semiconductors.

The ventilation can take place by forced ventilation via an external fan. At lower powers a removal of heat is also possible only by means of free convection.

In the case of forced ventilation, the intake of air into the channels of the extruded profile can take place via openings in the bearing plates. Neither the power electronics unit nor the active part of the motor comes into direct contact with the cooling air or the environment.

The motor system can be constructed as a permanently excited synchronous motor using tooth-wound coil technology, wherein each tooth-wound coil is provided with its own power semiconductor module.

In this design, in contrast to asynchronous motors, permanently excited synchronous motors have two advantages:

they can be constructed expediently using tooth-wound coil technology with them higher efficiency rates can be achieved at the same torque density.

Advantage 1 means that the switching power semiconductor can be connected directly to the tooth-wound coils, so that no further connection of the motor windings is necessary. This reduces the assembly costs and avoids faults.

As a result, a motor can likewise be constructed without a star point, wherein the coils are not brought together at a common star point. In this motor harmonic waves of the introduced currents can also be used to form a constant torque. Without a star point it is also not possible for current to flow through it and, as a result, bearing currents or the like are ruled out due to the system.

Advantage 2 leads to lower heat input and thus to a higher power density of the entire system or to a more compact system with the same power.

According to the invention it is no longer necessary to provide electrical connections from an externally arranged (frequency) inverter to the motor housing. A separate inverter housing for attaching to the machine housing is no longer necessary. The number of electrical connecting elements (connectors, leads, etc.) and thus the assembly costs fall, since the inverter and the motor are installed in one housing. The distribution of the heat input from the power semiconductors at different locations leads to a more homogeneous heating of the entire drive, so that the effective cooling surface is enlarged.

The heat input can take place at more than three locations and is therefore less concentrated locally.

Since the elements arranged in the first chamber are not in direct contact with the environment either by means of the cooling air or by some other means, any level of IP (International Protection) and also other protection classes, for example explosion-proof, etc., can be achieved.

Conveying the cooling air in closed channels ensures that the part facing away from the fan (generally the front part) is cooled better than if the cooling air from the fan is blown over open ribs, as is the case, for example, in standard asynchronous motors and all compact servo drives hitherto available on the market with external fans.

BRIEF DESCRIPTION OF THE DRAWINGS

The invention is described in detail below with reference to the drawings. In the drawings.

DETAILED DESCRIPTION OF THE DRAWINGS

Figure 1:
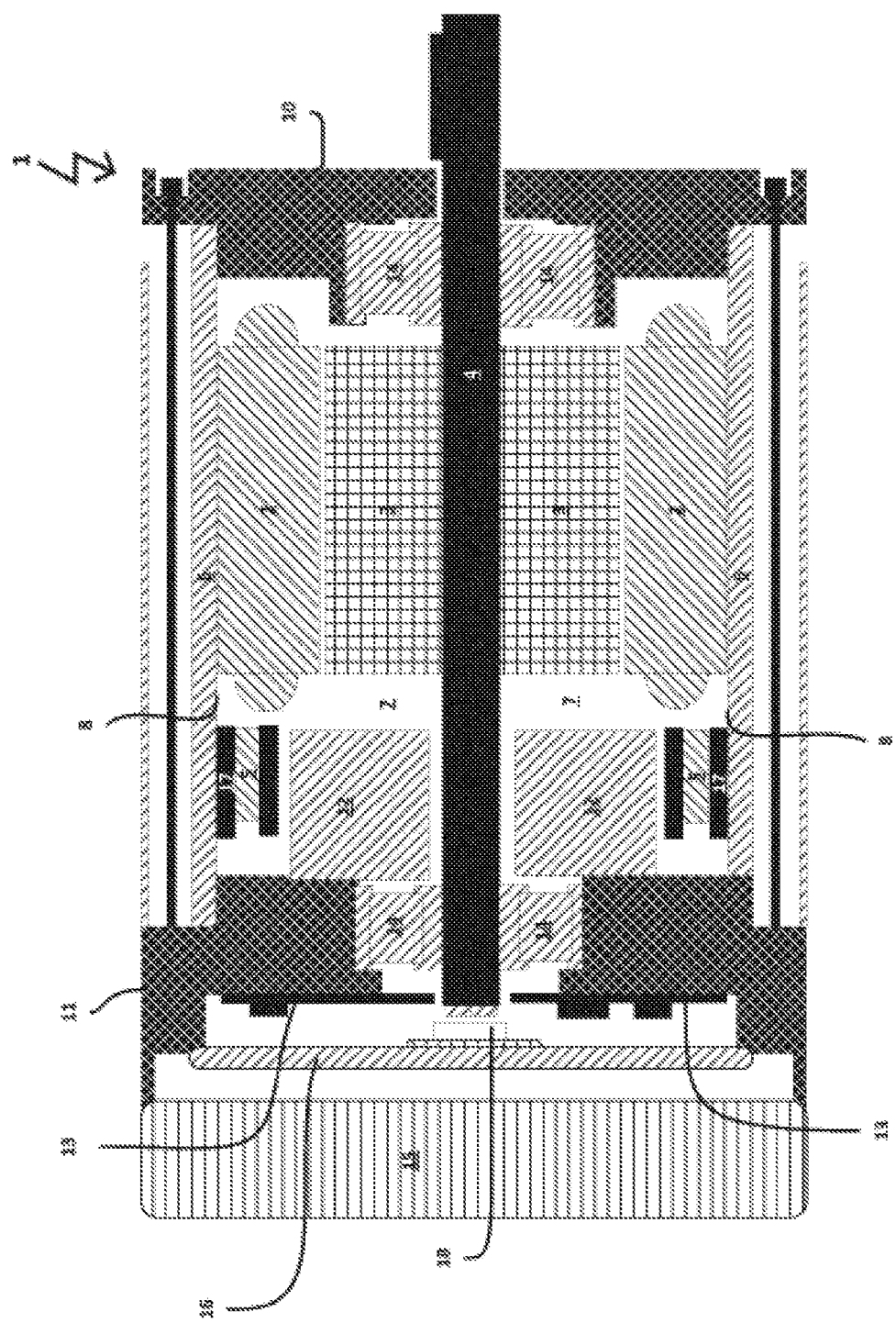
FIG. 1 shows a motor system according to the invention in a longitudinal section.

FIG. 1 shows a motor system 1 according to the invention.

The motor system 1 first of all comprises a stator 2, a rotor 3 and a motor shaft 4, which is mechanically coupled for conjoint rotation with the rotor, and which defines a radial direction and an axial direction of the motor system 1. "Axial" means in the longitudinal direction of the motor or in the direction of the axis of rotation of the motor shaft 4. "Radial" means perpendicular to the axis of rotation of the motor shaft 4.

The motor system 1 also has heat-generating components 5 in the form of power semiconductors or power modules.

The motor system also has a control device 13 in the form of a frequency converter which is designed to control operation of the motor system 1.

The motor system 1 also has an intermediate circuit capacitor 12 wound as a ring.

The motor system 1 is accommodated in a housing 6 in the form of a cylindrical extruded profile. The housing 6 has a first central cylindrical chamber 7 extending in the axial direction, wherein the stator 2, the rotor 3, the heat-generating components 5 and the intermediate circuit capacitor 12 are arranged inside the first chamber 7. The heat-generating components 5 are connected to an outer wall 8 of the first chamber 7.

Heat-conducting adapter plates 17 are arranged between the outer wall 8 and the respective heat-generating components 5, wherein the heat-generating components 5 are pressed against the adapter plates 17 by pressure application means 17 in order to improve the thermal conduction.

The housing 6 has an inner cylinder which forms the first chamber 7, wherein an inner surface of the cylinder constitutes the outer wall 8. On its end faces the motor system 1 has a first bearing plate 10 or a second bearing plate 11 each having motor shaft bearings 14, wherein a base surface of the inner cylinder is formed by the first bearing plate 10 and a cover surface of the inner cylinder is formed by the second bearing plate 11.

Figure 2:
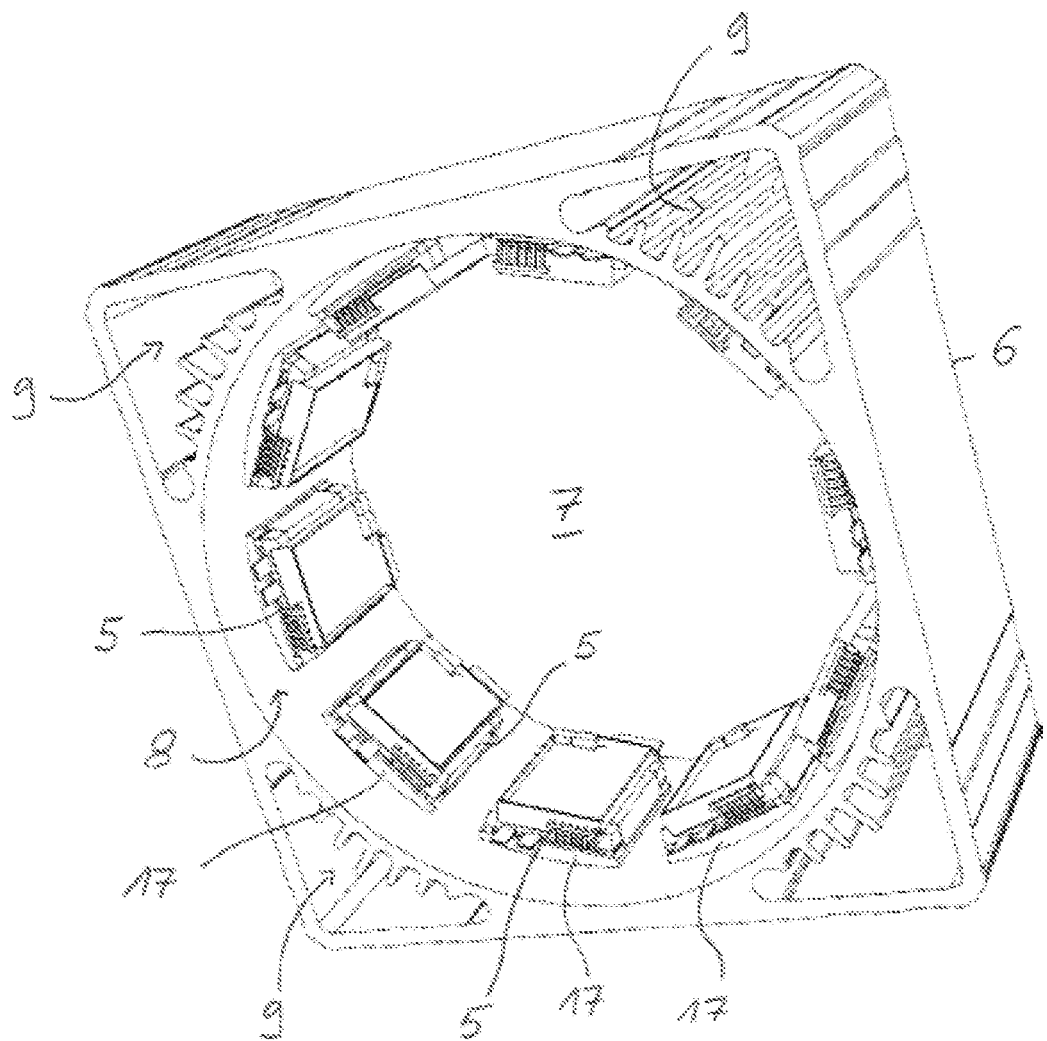
FIG. 2 shows a detail of the motor system shown in FIG. 1 in a perspective view.

On the B side of the motor system 1 a fan 15 is provided, which forces cooling air into closed cooling channels of the cylindrical extruded profile 6; in this connection see also the following description with reference to FIG. 2.

On the B side the motor system 1 is releasably closed by means of a housing cover 16.

A sensor 18 serves for detecting the rotor position. The sensor 18 is, in particular, a sensor which can detect the orientation of the magnetic field. From this the rotor position can be determined or evaluated. Alternatively, a conventional rotor position sensor (resolver, encoder, . . . ) can be used.

The control device 13, the sensor 18, the heat-generating components 5 or power semiconductor, the stator 2, the fan 15 and possibly further components can be operatively connected to one another, wherein the control device 13 receives and evaluates sensor signals and generates suitable control signals for the actuators.

FIG. 2 shows a detail of the motor system shown in FIG. 1 in a perspective view.

As shown in FIG. 2, the extrusion profile 6 has four second chambers 9 in addition to the first central cylindrical chamber 7. The second chambers 9 surround the first chamber 7 radially or on the outside. The second chambers 9 are provided with cooling fins.

The second chambers 9 form closed channels for conveying cooling air, which is forced into the chambers 9 or drawn through the chambers 9 by the fan 15. Because of the good thermal coupling between the outer surface 8 of the inner chamber 7 and the channels 9 and the plurality of points of contact of the power semiconductor 5 with the outer surface 8, a large amount of thermal energy can be drawn off through the channels 8.

In the embodiment illustrated in FIG. 2, the housing 6 is formed as an inner circular cylinder with an inner cylindrical casing 8, which is surrounded by an outer cylinder, the radial cross section of which is square. The outer and inner cylinders are connected to one another at four connection points. Alternatively, the outer cylinder can also be a circular cylinder, wherein in this case the inner and outer circular cylinder can be connected to one another by means of webs or pins, wherein the webs or pins define the cooling channels.

The invention claimed is:

1. A motor system, comprising:
   a stator,
   a rotor,
   a motor shaft, which is mechanically coupled for conjoint rotation with the rotor, and which defines a radial direction and an axial direction of the motor system,
   heat-generating components,
   a control device, which is configured to control an operation of the motor system, and
   a housing, said housing comprising:
   a first central chamber, wherein the stator, the rotor and the heat-generating components are arranged inside the first chamber, and wherein the heat-generating components are connected to an outer wall of the first chamber, and
   a number of second chambers, wherein the second chambers radially surround the first chamber fully on the outside, and wherein the second chambers form closed channels for guiding cooling air.

2. The motor system according to claim 1, wherein the housing has an inner cylinder which forms the first chamber, wherein an inner surface of the cylinder constitutes the outer wall.

3. The motor system according to claim 2, wherein the housing has a number of outer cylinders which form the number of second chambers.

4. The motor system according to claim 3, wherein the motor system has a first and a second bearing plate, wherein a base surface of the inner cylinder is formed by the first bearing plate and a cover surface of the inner cylinder is formed by the second bearing plate.

5. The motor system according to claim 2, wherein the motor system has a first and a second bearing plate, wherein a base surface of the inner cylinder is formed by the first bearing plate and a cover surface of the inner cylinder is formed by the second bearing plate.

6. The motor system according to claim 1, wherein the housing has a cylindrical extrusion profile.

7. The motor system according to claim 6, wherein the motor system has a first and a second bearing plate, wherein a base surface of the inner cylinder is formed by the first bearing plate and a cover surface of the inner cylinder is formed by the second bearing plate.

8. The motor system according to claim 1, wherein the stator and the heat-generating components are axially spaced apart from one another.

9. The motor system according to claim 8, wherein the heat-generating components are power semiconductors.

10. The motor system according to claim 1, wherein within a predetermined axial portion the heat-generating components are connected to the outer wall of the first chamber in a heat-conducting manner.

11. The motor system according to claim 1, wherein a radial cross-sectional area of the first chamber constitutes a regular polygon.

12. The motor system according to claim 1, wherein the motor system has an intermediate circuit capacitor wound as a ring.

13. The motor system according to claim 1, wherein the heat-generating components are power semiconductors.

14. The motor system according to claim 1, wherein the second chambers have internal surface-enlarging structures.

15. A motor system, comprising:
a stator,
a rotor,
a motor shaft, which is mechanically coupled for conjoint rotation with the rotor, and which defines a radial direction and an axial direction of the motor system,
heat-generating components,
a control device, which is configured to control an operation of the motor system, and
a housing, said housing comprising:
a first central chamber, wherein the stator, the rotor and the heat-generating components are arranged inside the first chamber, and wherein the heat-generating components are connected to an outer wall of the first chamber, and
a number of second chambers, wherein the second chambers are arranged radially fully outwardly of the first central chamber and the stator, rotor, and heat-generating components arranged inside the first central chamber, and wherein the second chambers form closed channels for guiding cooling air.

* * * * *